United States Patent [19]

Amagi et al.

[11] 4,159,244

[45] Jun. 26, 1979

[54] WASTE WATER-TREATING METHOD

[75] Inventors: Yasuo Amagi, Tokyo; Satoshi Inada, Ichigayadi, both of Japan

[73] Assignees: Kureha Kagaku Kogyo Kabushiki Kaisha, Tokyo; Toyo Boseki Kabushiki Kaisha, Osaka, both of Japan

[21] Appl. No.: 831,391

[22] Filed: Sep. 8, 1977

Related U.S. Application Data

[63] Continuation-in-part of Ser. No. 775,285, Mar. 7, 1977, abandoned, Ser. No. 635,402, Nov. 26, 1975, abandoned, and Ser. No. 448,490, Mar. 6, 1974, abandoned, said Ser. No. 775,285, is a continuation of said Ser. No. 635,402, and said Ser. No. 635,402, is a continuation of said Ser. No. 448,490.

[30] Foreign Application Priority Data

Mar. 14, 1973 [JP] Japan ..................... 48-29868

[51] Int. Cl.² ..................... C02B 1/14; C02C 5/02
[52] U.S. Cl. ..................... 210/20; 210/40
[58] Field of Search ..................... 210/17, 20, 40, 263, 210/290

[56] References Cited

U.S. PATENT DOCUMENTS

| | | | |
|---|---|---|---|
| 3,343,680 | 9/1967 | Rice et al. | 210/263 |
| 3,436,343 | 4/1969 | Smith | 210/40 |
| 3,658,697 | 4/1972 | Huether | 210/20 |
| 3,775,344 | 11/1973 | Amagi et al. | 210/40 |
| 3,855,120 | 12/1974 | Garbo | 210/20 |
| 4,009,098 | 2/1977 | Jeris | 210/17 |

FOREIGN PATENT DOCUMENTS 812332 3/1974 Belgium.
2071027 9/1971 France.

OTHER PUBLICATIONS

Weber et al., "Physicochemical Treatment of Wastewater," JWPCF, 1-1970, pp. 83–99.

*Primary Examiner*—Charles N. Hart
*Assistant Examiner*—Peter A. Hruskoci
*Attorney, Agent, or Firm*—Frishauf, Holtz, Goodman & Woodward

[57] ABSTRACT

There is provided a waste water-treating method which comprises passing an aqueous liquid, in an upward direction and at a suitable flow velocity, through a bed consisting of activated carbon whose particle diameter ranges between 0.20 and 1.5 mm and whose width of particle size range (or substantial difference between the largest ones and the smallest ones) is chosen to be 0.30 mm or more, controlling the fluidized bed of the carbon to be expanded 1.2 to 3.0 times to form a particle size gradient of the activated carbon along the resultant fluidized bed.

8 Claims, 2 Drawing Figures

WASTE WATER-TREATING METHOD

CROSS-REFERENCE TO RELATED APPLICATION

This is a continuation-in-part application of Ser. No. 775,285 filed Mar. 7, 1977, abandoned, Ser. No. 635,402 filed Nov. 26, 1975, abandoned and Ser. No. 448,490 filed Mar. 6, 1974, abandoned, said Ser. No. 775,285 is a continuation of Ser. No. 635,402 and said Ser. No. 635,402 is a continuation of Ser. No. 448,490.

BACKGROUND OF THE INVENTION

This invention relates to a method of treating waste water by means of a fluidized adsorption bed. Pollution by waste water has become one of great social problems. Pollutants of waste water includes miscible and immiscible forms of pollutant. Suspended solids included in immiscible pollutants of waste water can be effectively removed mainly by filtration during treatment of waste water. Further, immiscible oily matter included in the immiscible pollutants can also be effectively treated by combination of coagulation and flocculation. However, filtration coagulation or flocculation exerts little advantageous effect on treatment of miscible pollutants. One of the miscible pollutant-treating methods is to remove miscible pollutants by transforming them into the immiscible form, using activated sludge. Another miscible pollutant-treating method is to adsorb miscible pollutants by adsorbent. Adsorption by activated carbon has proved very effective for removal of particularly nonionic miscible pollutants. Since treatment of waste water is often primarily intended to eliminate nonionic miscible pollutants, application of activated carbon occupies a very important position in this particular field.

The oldest waste water-treating method based on activated carbon comprises the steps of throwing powdered activated carbon into waste water to remove pollutants by adsorption and filtrating out pollutant-laden powdered activated carbon to clean waste water. Even at present, this process is still locally followed. However, pollutant-laden powdered carbon whose regeneration is accompanied with considerable difficulties is as a rule simply dumped. Since such dumped material raises a problem of secondary pollution, the present trends is toward application of granular activated carbon which enables said spent carbon to be regenerated instead of being thrown away and used again by recycling.

A known waste water-treating method based on granular activated carbon is a fixed bed of granular activated carbon. A process proposed by Dostal, K. A., et al (Journal of AWWA, Sept. 1966, page 1170) has the advantage that since a mass transfer zone is formed in a fixed bed of granular activated carbon, a relatively long period time is required for a break-through point (that is, a maximum acceptable effluent concentration used in the above-mentioned literature) to be reached. However, this proposed waste water-treating process has the drawbacks that granular activated carbon of a small particle size, although such an activated carbon can attain quick adsorption when applied to the process, leads to unfavorably large pressure loss, thus only allowing application of granular activated carbon having a relatively large particle size and consequently performing slow adsorption; the fixed bed of granular activated carbon is clogged by immiscible pollutants entrained with waste water; pressure loss tends to be increased due to the fixed bed being closed by the growth of, for example, microbes, algae and mosses on the surface of packed activated carbon; a complicated operation such as back washing is required to clean the fixed bed; and waste water tends to be biased due to channeling.

An attempt to resolve the drawbacks accompanying the above-mentioned waste water-treating method based on a fixed bed of granular activated carbon, has been made using a fluidized bed in an ordinary sense (disclosed, for example, in Journal of Water Pollution Control Federation, by Weber, W. J. Jr., et al, April, 1965, 37 (4), page 425). This fluidized bed process has advantages over the fixed bed process in that a bed of activated carbon is not clogged up with immiscible substances or microbial suspensions; low pressure loss admits of application of powdered activated carbon having a small particle size and consequently carrying out quick adsorption.

Still, this proposed fluidized bed process has the drawbacks that since back mixing of granules of activated carbon takes place due to fluidization (FIG. 1), the mass transfer zone described in connection with a fixed bed of activated carbon tends to extend upward in the direction in which granules of activated carbon are fluidized, causing the break-through point of activated carbon to be soon reached, and consequently making it necessary frequently to replace spent activated carbon.

An attempt (Japanese patent disclosure No. 79169, 1973) was proposed to eliminate the drawbacks of the conventional fluidized bed type waste water-treating process based on granular activated carbon in which the above-mentioned back mixing of granules of activated carbon occurred. According to this attempt, a multistaged fluidized bed was constructed by partitioning the adsorption section of a fluidized bed by a large number of porous plates to prevent the back mixing of granules of activated carbon, thereby forcefully providing a mass transfer zone apparently approximating that which was provided in the fixed bed. However, this multi-staged fluidized bed was accompanied with the drawbacks that the apparatus had a complicated and bulky construction; merit could not be expected, unless the apparatus was coupled to a regeneration device to regenerate the adsorptive power of granular activated carbon by continuous circulation; and the apparatus did not offer economic advantages except when the apparatus was applied on a tremendously large scale.

SUMMARY OF THE INVENTION

The inventors have overcome such drawbacks as accompanied by various prior art waste water-treating devices and invented a very simple and efficient fluidized bed type adsorption method.

According to an aspect of this invention, there is provided a waste water-treating method which comprises the steps of introducing waste water in the form of a uniformalized or plug flow into the vertically extending adsorption section of a fluidized bed of granules of activated carbon for contact with granules of activated carbon whose particle size ranges between 0.20 and 1.5mm, whose width of particle size range is 0.30mm or over, whose specific density (or particle density as measured by mercury emersion method) is 0.8 to 0.9 (g/cc) and which has such a particle size distribution as in the case that the range of the particle size is divided into three equal width of particle size range, each volume of activated carbon belonging to the respective division is to fall within the range of 33±7% (V/V) to the total volume, thereby treating waste water with controlling the expansion ratio of the fluidized bed of granular activated carbon to 1.2 to 3.0 times to attain the gradation of granules of activated carbon along the particle size.

DETAILED DESCRIPTION OF THE PREFERRED EMBODIMENTS

This invention provides a fluidized bed type waste water-treating method which eliminates the drawbacks accompanying the prior art fixed bed type waste water-treating device, such as increased pressure loss when granules of activated carbon having a small particular size are used, clogging of the fixed bed, biased flow of waste water and the back mixing of granules of activated carbon; and is based on such adsorption process as eliminates the necessity of providing a complicated and large-scale device like the conventional multi-staged fluidized bed comprising a large number of perforated plates.

The waste water-treating method of this invention based on a fluidized bed has the advantages that it is possible to apply granules of activated carbon of small particle size which attain extremely quick adsorption; since the fluidized bed used with the method of the invention is avoided from clogging even when immiscible substances like suspended solids, etc. are not removed by pretreatment, a complicated operation such as back washing is unnecessary; a mass transfer zone takes a form approximating that which is observed in the case of a fixed bed, causing a break-through point of activated carbon to be reached only after an extremely long period of time, thereby noticeably reducing the frequency of regenerating spent granules of activated carbon; absence of a large number of perforated plates enables the subject waste water-treating apparatus to have a simple construction and be rendered very inexpensive; and said apparatus is also well adapted to treat waste water on a small scale.

The first characteristic of the waste water-treating method of this invention is that granules of activated carbon having a prescribed distribution of particle size are used; the second characteristic is that the adsorption section of the fluidized bed of activated carbon is brought into contact with the upward streams of waste water substantially taking the form of a uniform or plug flow; and the third characteristic is that waste water is always made to contact the adsorption section of the fluidized bed while controlling the linear velocity of said waste water so as to cause the expansion ratio of a fluidized bed of granular activated carbon to fall within the prescribed range.

Figure 1:
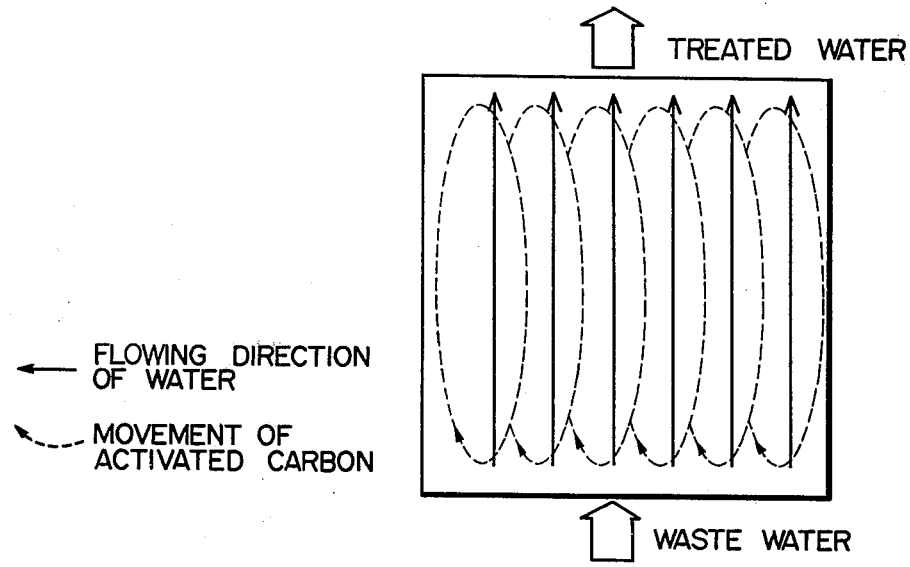
FIG. 1 illustrates the movement of granules of activated carbon when applied in the form of the prior art fluidized bed.
Figure 2:
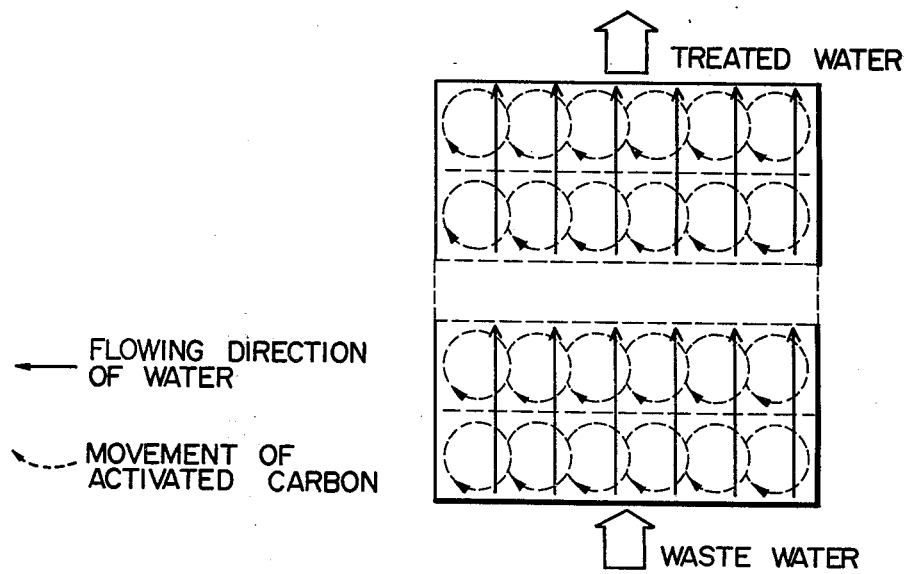
FIG. 2 indicates the movement of granules of activated carbon when applied in the form of a fluidized bed embodying this invention.

There is described an experiment made with the method of this invention. When waste water flowing in the form of a uniform or plug flow was brought into contact with a fluidized bed of granules of activated carbon having a prescribed distribution of particle size at such a linear velocity as bringing about the expansion ratio of the fluidized bed to fall within the prescribed range, then the granules of activated carbon presented gradation, as shown in FIG. 2, while the fluidized bed of granules of activated carbon expanded vertically with gradation in accordance with the particle size from the bottom to the top. What was surprising in the above-mentioned experiment was that prticles of activated carbon vertically moved only within a very narrow range and consequently provided substantially the same effect as observed when the adsorption section of a fluidized bed of granules of activated carbon was partitioned by a large number of porous plates. Namely, though the adsorption section of the fluidized bed of activated carbon was not partitioned by numerous porous plates, the back mixing of granules of activated carbon did not take place. Therefore, a mass transfer zone apparently approximating that which appeared in the fixed bed was formed in the fluidized bed of this invention, with the result that a period of time required for a break-through point of activated carbon to be reached was far more extended than in the prior art fluidized bed. This invention is a very efficient waste water-treating method developed by the above-mentioned discovery which comprises the step of bringing waste water into contact with upstreams of fluidized granules of activated carbon.

Commercially available activated carbon is considerably inadequate as granular activated carbon for use with the method of this invention, because marketed activated carbon is quite unsatisfactory in respect of the range and distribution of particle size.

The particle size of granules of activated carbon adapted to be used with the method of this invention is preferred to range from 0.20 to 1.50mm. Smaller granules of activated carbon than those lying within this range are not effective. The reason is that the flow rate of waste water has to be very much reduced in order to attain the later described proper expansion ratio of a fluidized bed of activated carbon, because when waste water flows at the ordinary flow rate, then the fluidized bed of such small particles of activated carbon is expanded in a higher ratio than prescribed; and also that these small particles of activated carbon are likely to be carried away by flowing waste water. Conversely, larger granules of activated carbon than those lying within the aforesaid specified range makes it necessary prominently to increase the flow rate of waste water in order to attain the later described proper expansion ratio of a fluidized bed of activated carbon, with the result that waste water contacts the activated carbon for an insufficient length of time, leading to the inefficient adsorption of pollutants of waste water to the activated carbon. Further, the granular activated carbon to be used with the method of this invention is preferred to fall within the range of 0.30 to 1.30mm in the particle size and to be 0.30mm or over in width of particle size range (, or the substantial difference of the largest ones and the smallest ones). Granules of activated carbon which is smaller in above-mentioned width of particle size range than thus specified tends to give rise to the previously described back mixing and fails to attain an ideal gradation. Conversely, if said width is considerably larger than specified, then the aforesaid prescribed range of the particle size will be exceeded.

Moreover, granules of activated carbon to be used with the method of this invention should have a flat particle size distribution. Concretely expressed, such a particle size distribution is preferred as when the range of the particle size of granular activated carbon is divided into the equal width of particle size range, then each volume of activated carbon belonging to the respective portion is to fall within the range of 33±7% to the total volume. Unless the particle size distribution of granular activated carbon satisfies the above-mentioned requirements, granules of activated carbon tend to give rise to back mixing when brought into contact with waste water and difficulties in attaining a stable and ideal gradation. The specific density (or particles density) of granules of activated carbon falling within the range of 0.8 to 0.9 (g/cc) are preferred for attainment of a stable gradation. The flow of waste water is preferably made to pass through a rectifier prior to contact with granules of activated carbon having a flat particle size distribution in the adsorption zone of the fluidized bed of said activated carbon. When waste water passes through the fluidized bed of activated carbon in the form of a turbulent flow instead of a plug flow, then granules of activated carbon presents back and forth movements, namely back mixing even when used granules of activated carbon have a flat particle size distribution, resulting in an undesirable extension of a mass transfer zone in the fluidized bed. Furthermore, since granules of activated carbon are heavier than water, said granules do not present gradation resulting from the expansion of a fluidized bed of activated carbon, unless waste water is brought into contact with the activated carbon in the form of upstreams.

For the most ideal gradation of granules of activated carbon, it is preferred to bring waste water into contact with granular activated carbon while controlling its linear velocity so as to give rise to 1.2 to 3.0 times of expansion ratio of fluidized bed height to that of setting state. Relationship between the expansion ratio of a fluidized bed of granular activated carbon and the linear velocity of waste water to some extent varies with, for example, the range of the particle size of granular activated carbon and the viscosity of waste water (subject to changes by the temperature thereof). When granules of activated carbon used meet the prescribed range and distribution of the particle size, then the linear velocity of waste water within the range of about 10 to 40 m/h, can give rise to the aforementioned expansion ratio. When the expansion ratio of a fluidized bed of granular activated carbon falls below 1.2 times, then waste water flows too slowly for economical water treatment rate. Conversely, when the expansion ratio rises above 3.0 times, then granules of activated carbon presents an unstable gradation, possibly resulting in the back mixing of said granules and consequently a decline in the adsorption efficiency. The adsorption section of a fluidized bed of granular activated carbon is preferred to have a vertical columnar form in order to make waste water flow a plug flow through the adsorption section, thereby attaining the stable gradation of granules of activated carbon. Otherwise, the plug flow would be changed into a turbulent flow to give rise to the back mixing of granules of activated carbon.

The bottom portion of the adsorption section beneath a fluidized bed of granular activated carbon preferably is provided with a rectifying structure consisted of combining, for example, layers of sand, pebbles and porous concrete strainers in one or more sets. For use of this invention, truly spherical granules of activated carbon are most preferred. Such granules of activated carbon may be prepared by the process set forth in U.S. Pat. No. Re. 29,101. However, granules of ordinary commercially available activated carbon is unfavorably sharp in particle size distribution, that is, not flat enough in particle size distribution. When, therefore, such commercial granular activated carbon is utilized for use of this invention, then it is advised first to classify said granules into several groups by sieving and thereafter blend granules belonging to the respective groups to provide the prescribed range and distribution of particle size of granular activated carbon. This procedure can render ordinary commercially available granular activated carbon adapted for use of this invention.

This invention will be more fully understood with reference to the following examples.

EXAMPLE 1

Commercially available spherical and granular activated carbon particles were sieved and blended to provide samples of granules of activated carbon varying in, for example, the particle size range, width of particle size range and particle size distribution (by volume). The sample granules of activated carbon thus prepared had physical properties as set forth in Table 1 below. The A and B groups of granules of activated carbon shown in Table 1 were filled in an adsorption tower, and examination was made of the condition in which both groups of sample groups of activated carbon were mixed.

Table 1

| | Example | | | | Control | | | |
|---|---|---|---|---|---|---|---|---|
| Sample | A | B | C | D | E (C) | F (D) | G (D') | H |
| Shape | sphere | granule | sphere | sphere | sphere | sphere | sphere | sphere |
| Smallest particle size (mm) | 0.20 | 0.20 | 0.25 | 0.35 | 0.42 | 0.59 | 0.35 | 0.15 |
| Largest particle size (mm) | 0.60 | 0.63 | 0.59 | 1.00 | 0.52 | 0.71 | 1.00 | 1.80 |
| Width of particle size range | 0.40 | 0.43 | 0.34 | 0.65 | 0.10 | 0.12 | 0.65 | 1.65 |
| Percentage volume of three* divided portions: | | | | | | | | |
| Smallest particle portion (% vol) | 27 | 33 | 30 | 32 | 28 | 30 | 43 | 32 |
| Middle particle portion (% vol) | 33 | 40 | 37 | 34 | 37 | 37 | 38 | 34 |
| Largest particle portion (% vol) | 40 | 27 | 33 | 33 | 35 | 33 | 19 | 33 |
| Particle density (g/ml) | 0.86 | 0.80 | 0.85 | 0.86 | 0.86 | 0.86 | 0.86 | 0.85 |
| Surface area (m²/g) | 1050 | 1100 | 1050 | 1050 | 1050 | 1050 | 1050 | 1100 |

*Determination was made of a percentage total volume of sample granules of activated carbon belonging to each of the three divided portions of equal width of the particle size range.

EXAMPLE 1-A

24 Tons of truly spherical granules of activated carbon having a particle size distribution shown in Example A Table 1 above were charged in an adsorption tower 3.48 meters in diameter. Waste water was made to flow upward through the adsorption tower at a flow rate of 10 m/hr. At this time, the expanded fluidized bed of said granular activated carbon had a height of 6.5 meters. The expanded fluidized bed was divided into three conceptual zones (a), (b) and (c) of equal bed height arranged one atop another in a vertical direction. The granules of activated carbon were sampled at the center of the respective zones to determine the particle size distribution of the granular activated carbon, the results being set forth in Table 2 below. In this example, the flow of waste water was made uniform by a combination of a porous concrete strainer and a layer of a sand provided at the bottom of the adsorption tower.

Table 2

| | Gradation of fluidized granules of activated carbon | | |
|---|---|---|---|
| | Percent by volume | | |
| Size \ Zone | (a) | (b) | (c) |
| 200–250(μ) | 60 | | |
| 251–300 | 31 | | |
| 301–350 | 9 | 8 | |
| 351–400 | | 62 | |
| 401–450 | | 28 | 3 |
| 451–500 | | 2 | 29 |
| 501–550 | | | 43 |
| 551–600 | | | 25 |

EXAMPLE 1-B 0.5 Ton of granules of activated carbon having a particle size distribution indicated in Example B Table 1 above was put in an adsorption tower 0.96 meter in diameter. Waste water was introduced upward through the adsorption tower at a flow rate of 20 m/hr. At this time, the upward expanded fluidized bed had a height of 3.2 meters. The expanded fluidized bed was divided into three conceptual zones (a), (b) and (c) of equal bed height arranged one atop another in a vertical direction. The granules of activated carbon were sampled at the center of the respective zones to determine the particle size distribution of granular activated carbon, the results being presented in Table 3 below. In this example, the flow of waste water was made formal by a combination of a porous concrete strainer and a layer of sand provided at the bottom of the adsorption tower.

Table 3

| | Gradation of fluidized granules of activated carbon | | |
|---|---|---|---|
| | Percent by volume | | |
| Size \ Zone | (a) | (b) | (c) |
| 200–250 (μ) | | | |
| 251–300 | 33 | | |
| 301–350 | 67 | 5 | |
| 351–400 | | 88 | |
| 401–450 | | 7 | 31 |
| 451–500 | | | 30 |
| 501–550 | | | 23 |
| 551–600 | | | 16 |
| 601–630 | | | |

Both Examples 1-A and 1-B indicate that larger granules of activated carbon were present in the lower zone of the fluidized bed, medium size granules thereof in the central zone and smaller granules thereof in the upper zone, bringing the granules of activated carbon in a gradated state.

EXAMPLE 2

Waste water was passed through a graded fluidized bed of granules of activated carbon varying, as shown in Table 1 above, in the range and distribution of particle size and width of particle size range. By measuring $C_E$ and $C_I$, determination was made of the duration reaching break-through point, taking the point of time for the value $[C_E/C_I]$ to attain to 0.2 as break-through point, where $C_E$ and $C_I$ represent pollutant concentration in effluent water and influent water, respectively. A waste water-treating apparatus used was a round column of acrylonitride resin 250mm or 80mm in diameter. The section of the apparatus which formed the uniform flow of waste water was a sand layer laid on a 50-mesh screen prepared from Saran (trademark of polyvinylidene fiber manufactured by Dow Chemical Co. of U.S.A.). Sample granules of activated carbon were charged in an amount of 15kg or 0.5kg. Various forms of waste water were made to contact the samples of activated carbon at different flow rates. Periods required for the break-through points of the respective samples of activated carbon to be reached are given in Table 4 below together with other data.

Table 4

| | Examples | | | | | | Comparative Examples | | | | | | |
|---|---|---|---|---|---|---|---|---|---|---|---|---|---|
| | 1 | 2 | 3 | 4 | 5 | 6 | 1a | 1b | 2a | 3a | 4a | 5a | 6a |
| Nature of waste water: | Waste water from petrochemical plant | Model waste water from dye works | Waste water from chemical plant | Waste water from paper mill | Waste water from machine plant | Sewage from living quarters | Waste water from petrochemical plant | Waste water from petrochemical plant | Model waste water from dye works | Waste water from chemical plant | Waste water from paper mill | Waste water from machine plant | Sewage from living quarters |
| Cin (ppmCOD) | 120 | 100[1] | 105 | 220 | 80 | 120 | 120 | 120 | 100[1] | 105 | 220 | 80 | 120 |
| Column diameter (mm) | 250 | 80 | 250 | 250 | 250 | 250 | 250 | 250 | 80 | 250 | 250 | 250 | 250 |
| Charged amount of activated carbon (kg) | 15 | 0.5 | 15 | 15 | 15 | 15 | 15 | 15 | 0.5 | 15 | 15 | 15 | 15 |
| Linear velocity of waste water (m/hr.) | 19 | 25 | 15 | 10 | 18 | 10 | 19 | 30 | 25 | 15 | 10 | 18 | 10 |
| Nature of activated carbon | C | D | D | C | C | D | E | C | F | G | H | E | F |
| Expansion ratio of | 2.2 | 2.8 | 1.8 | 1.5 | 2.0 | 1.6 | 1.5 | 4.1 | 2.3 | 2.5 | 4.1 | 1.4 | 1.1 |

Table 4-continued

|  | Examples | | | | | | Comparative Examples | | | | | | |
| --- | --- | --- | --- | --- | --- | --- | --- | --- | --- | --- | --- | --- | --- |
| Nature of waste water: | 1 Waste water from petrochemical plant | 2 Model waste water from dye works | 3 Waste water from chemical plant | 4 Waste water from paper mill | 5 Waste water from machine plant | 6 Sewage from living quarters | 1a Waste water from petrochemical plant | 1b Waste water from petrochemical plant | 2a Model waste water from dye works | 3a Waste water from chemical plant | 4a Waste water from paper mill | 5a Waste water from machine plant | 6a Sewage from living quarters |
| fluidized bed Period of time required for break-through point (hr.) | 28 | 9 | 33 | 41 | 25 | 44 | 0 | 3 | 5 | 7 | 6 | 0 | 8 |

[1]An aqueous solution of methylene blue was used as model waste water exhausted from a dye works (the concentration of methylene blue is indicated in ppm (mg/l).

Table 4 clearly shows that the examples using the waste water-treating method of this invention displayed for more excellent results than the comparisons operated under the conditions falling onside of the range specified in the method of the invention.

What is claimed is:

1. A waste water-treating method for removal of a miscible pollutant present in a waste water which comprises the steps of passing said waste water upwardly through a adsorption bed comprising at least one layer of sand, pebbles or porous concrete to form a uniformly upward or plug flow upwardly through the vertically extending adsorption section of a fluidized bed of particles of activated carbon for contact with particles of activated carbon whose particle size ranges between 0.20 and 1.5 mm and the difference between the largest of said particles and the smallest of said particles is at least 0.30 mm, whose particle density is 0.8 to 0.9 g/cc and which has such a particle size distribution as in the case that the range of the particle size is divided into three equal width of particle size range, each volume of activated carbon belonging to the respective division is to fall within the range of 33±7% (V/V) to total volume, the linear velocity of the waste water being controlled to produce an expansion ratio of fluidized bed height of the granular activated carbon of from 1.2 to 3.0 times the bed height under settled state.

2. The method according to claim 1, wherein spherical activated carbon is used.

3. The method according to claim 1, which treats waste water from a petrochemical plant.

4. The method according to claim 1, which treats waste water from a chemical plant.

5. The method according to claim 1, which treats waste water from an iron works.

6. The method according to claim 1, which treats waste water from a paper mill.

7. The method according to claim 1, which treats waste water from a dye works.

8. The method according to claim 1, which treats sewage from living quarters.

* * * * *